Figure 3:
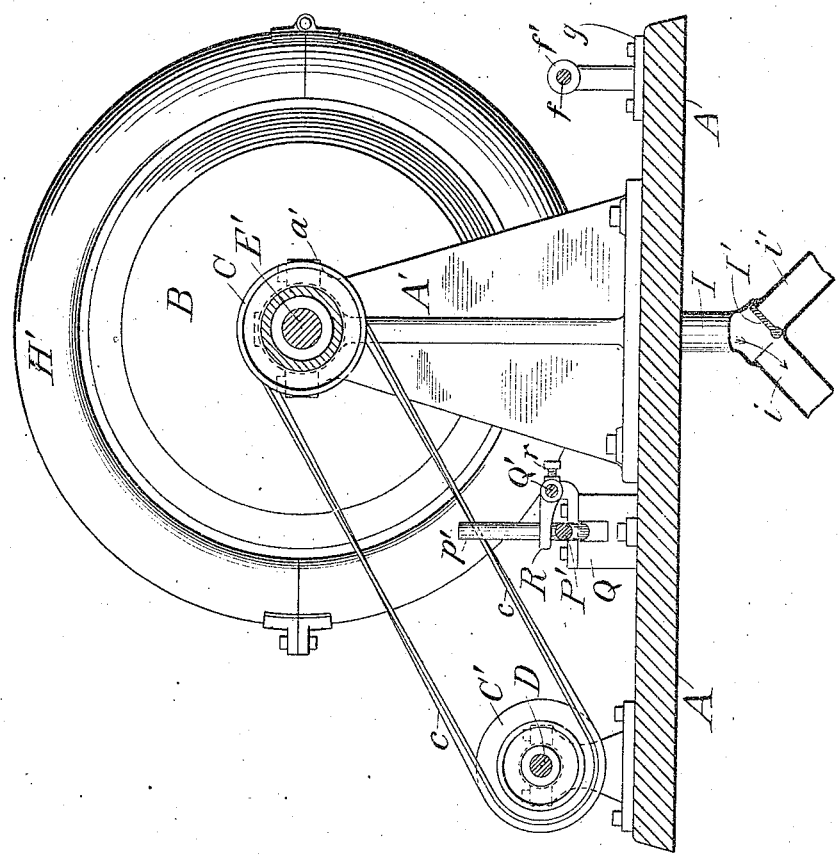

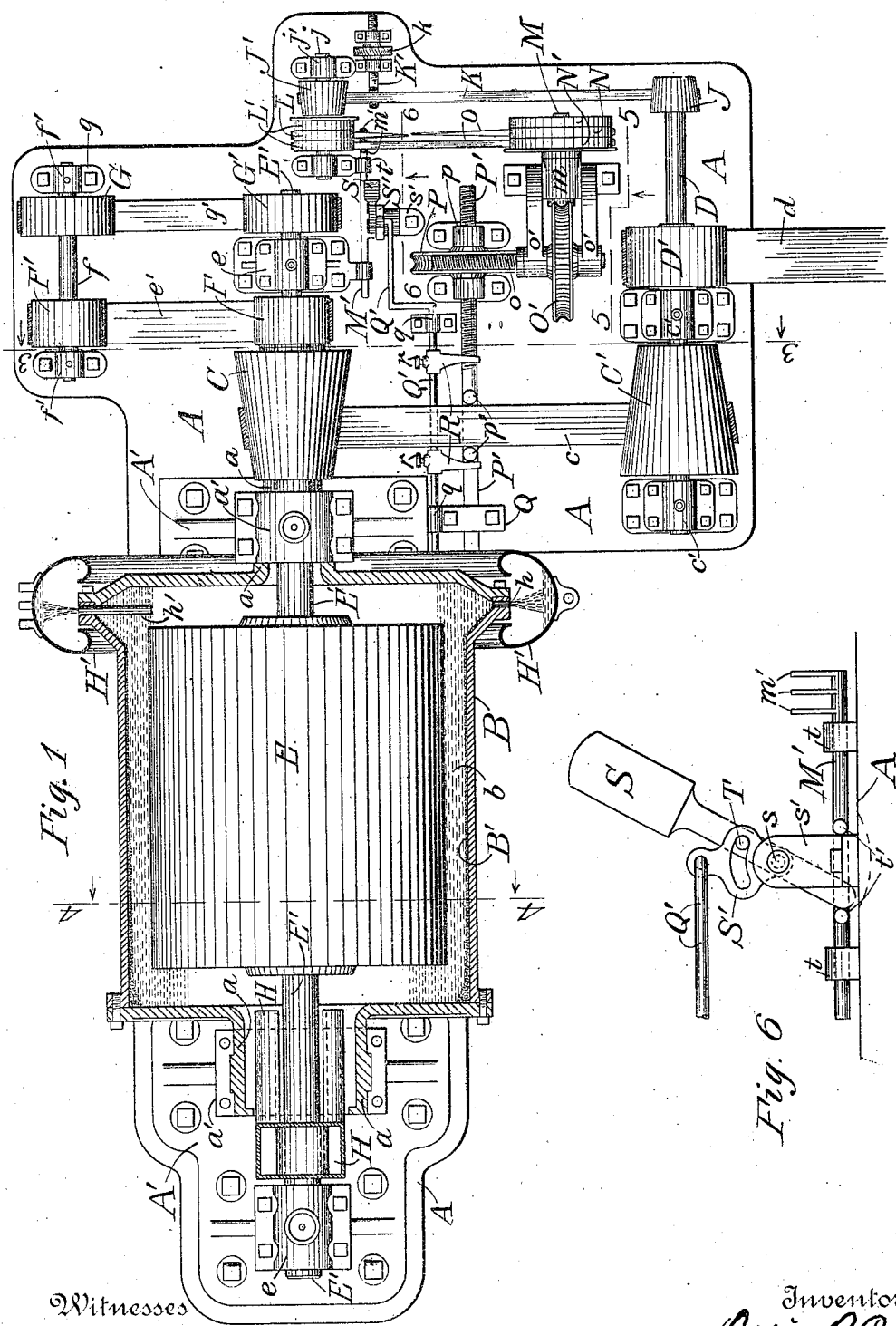

(No Model.) 3 Sheets—Sheet 2.
O. B. PECK.
ART OF CENTRIFUGAL SEPARATION.
No. 499,349. Patented June 13, 1893.
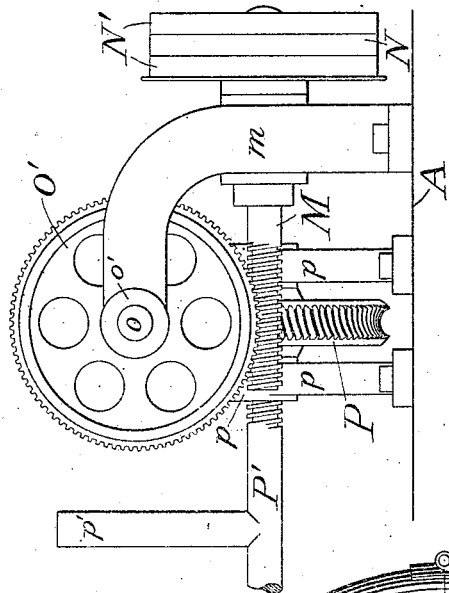
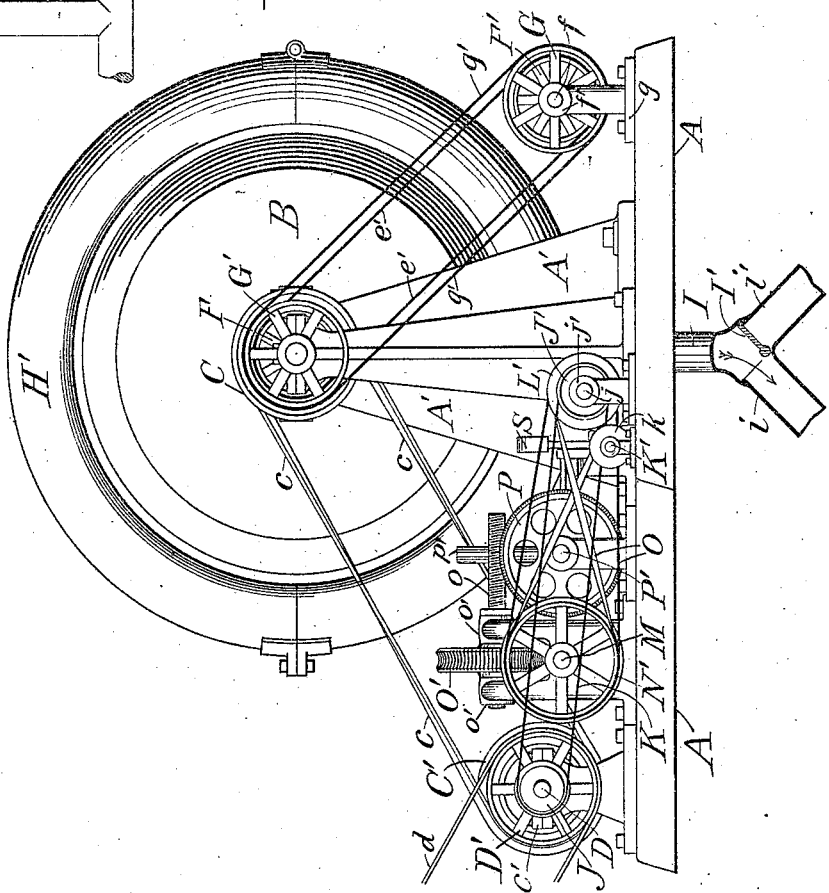
Witnesses
E. C. Peck
Charles E. Tetley
Inventor
Orrin B. Peck (No Model.) 3 Sheets—Sheet 3.

O. B. PECK.
ART OF CENTRIFUGAL SEPARATION.

No. 499,349. Patented June 13, 1893.

Witnesses
E. C. Peck.
Charles E. Tetley

Inventor
Orrin B Peck

UNITED STATES PATENT OFFICE.

ORRIN B. PECK, OF CHICAGO, ILLINOIS, ASSIGNOR TO MELINDA PECK, OF SAME PLACE.

ART OF CENTRIFUGAL SEPARATION.

SPECIFICATION forming part of Letters Patent No. 499,349, dated June 13, 1893.

Application filed March 6, 1893. Serial No. 464,799. (No model.)

*To all whom it may concern:*

Be it known that I, ORRIN B. PECK, a citizen of the United States, residing at Chicago, Illinois, have invented certain new and useful Improvements in the Art of Centrifugal Separation, of which the following is a specification.

To enable a better and more comprehensive understanding of my invention, the illustrations and descriptions thereof, I will here state, that if a constant quantity of water be flowed or passed through a channel, passage or space, and the size of such space be varied during the flow, the velocity of the flow will be varied inversely as the variance of the size, or area of section of such space, and its momentum or impulse will be varied as the square of the variance in the velocity of its flow, and inversely as the square of the variance in the size, or area of the channel, passage or space through which it flows. It is also a known fact that centrifugal force or its intensity, varies as the square of the variance in velocity of rotation of a constant diameter. It therefore follows that if a vessel containing a channel or passage around near its outer diameter be rotated with sufficient rapidity to develop a minimum desired intensity of centrifugal force, and if material containing heavier and lighter substances be fed or passed into such channel or passage with a requisite amount or quantity of water, to fill the same, and move or flow through it with sufficient velocity to develop momentum or impulse of an intensity relative to the centrifugal force being developed, to move and carry the lighter portions of the material through the channel or passage, and to permit the heavier to accumulate therein,—the accumulating of the heavier portion will decrease the size or area of the passage through which the water is flowing, increasing its velocity of flow inversely as the size of the space is varied, and its momentum or impulse as the square of its velocity of flow, and inversely as the square of variance in the size of the channel, or passage. Hence it will be seen that the relative intensity of the forces being developed will be destroyed immediately; the force of momentum or impulse very quickly increasing to such an extent as to carry the heavier portions of the material through with the lighter, without effecting their separation. Since, however, as above stated, the intensity of centrifugal force varies as the square of speed of rotation; in such respect bearing similar relations to velocity of rotation, as momentum or impulse of water does to its velocity of flow, by my improved process or method of separation, and of operating centrifugal ore separators, illustrated in the accompanying drawings, and herein described, the speed of rotation of the vessel being increased approximately as the velocity of flow of the water through the channel or passage, the initial relative intensities of the forces will be approximately maintained throughout the operation, and the desired separation effected. Therefore, to the end of carrying out my improved processes or methods, I provide or construct a centrifugal ore separator embodying the means, features and details, illustrated in the drawings and herein described, of which—

Figure 4:
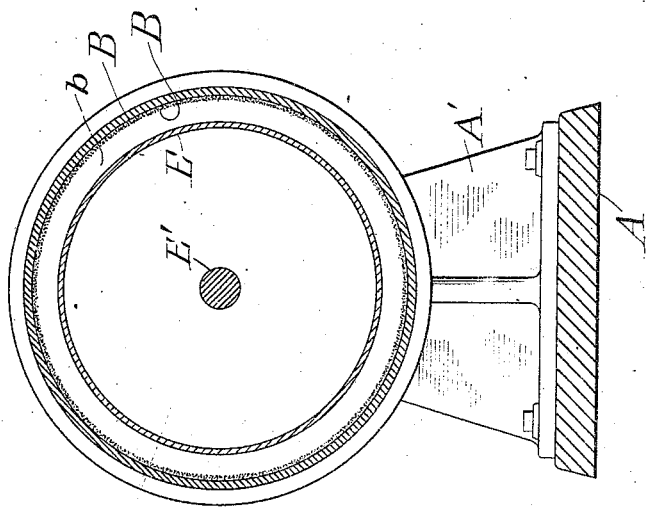

In the drawings Figure 1, is a top plan view of my improved separator, with the treatment vessel and feed, and discharge spouts or troughs in section. Fig. 2 is an end elevation of the right hand of Fig. 1, looking toward the left. Fig. 3, is a cross sectional elevation on line 3. 3. of Fig. 1, looking in the direction of the arrows. Fig. 4, is a cross sectional elevation on line 4. 4. of Fig. 1, looking in the direction of the arrows. Fig. 5 is a side elevation of some of the detail parts enlarged taken on line 5. 5. of Fig. 1, looking in the direction of the arrows, and Fig. 6, is a detail side elevation of some of the parts enlarged taken on line 6, 6, of Fig. 1, looking in the direction of the arrows.

I make or provide a bed, plate or frame A, on which the parts are preferably mounted. I provide a treatment cylinder B although not necessarily a vessel or cylinder in a technical sense, and preferably partly close it at its end so as to be adapted to contain a body of water, or a sufficient quantity to submerge the separating surface and the material under treatment,—and provide it with a separating surface B', on its inside preferably forming all or a part of its interior wall. This vessel is preferably arranged in a horizontal position, and is mounted on brackets A', supported by suitable preferably hollow trunnions or shafts a, in bearings a'. It is preferably provided with an elongated cone-shaped belt surface, pulley, or drum C, preferably formed or secured to the end of one of the trunnions of the vessel, and preferably operated by a belt c, driven by a corresponding counter cone C', suitably relatively located and properly mounted on the shaft D, supported in bearings or journals c'. On the shaft D, is also mounted a pulley D', which may be driven by a belt d, from any appropriate motive power, so that the vessel may be rotated through its connections therewith as explained, and its speed of rotation may be varied or regulated by shifting the position of the belt c, on its cones in the one direction or the other, as hereinafter described.

Within the treatment vessel I preferably arrange a deflector, E, the outside of which, or the larger portion thereof corresponds to the inside of the vessel, leaving an annular space, passage or channel b, between them, in which the separation of the material is effected, as hereinafter described, and with the separating surface B', preferably forming one side or wall of such channel or passage. This deflector serves to assist in distributing material being treated uniformly over the separating surface, and to deflect or guide it along near or in proximity to such surface. The deflector, however, may be dispensed with, if desired, when the conditions attending the operation will permit, and when it is used it is not necessary that it be in the form shown. The channel in which the material is treated need not necessarily be annular or extend around the interior of the vessel, as separate channels may be used instead of the one continuous channel, if preferred. I shall for convenience, however, describe the construction, arrangement and operation of my improvement as they are exhibited in the drawings, but do not intend to limit myself strictly to details, for as much latitude may be indulged as the conditions and circumstances may permit.

The deflector is preferably provided with shafts or trunnions E', which extend out through the hollow trunnions of the vessel, and are properly supported in bearings e.

In order to rotate the deflector I mount a pulley G', on one end of one of the shafts or trunnions E', so that it may be rotated by a belt g', preferably from a pulley G, mounted on a counter shaft f, appropriately located and supported in bearings or boxes f', on the pedestals g. A pulley F', is also mounted on the shaft f, and is preferably rotated by a belt e', operated by the pulley F, preferably on the extended end of the vessel cone C, so that the deflector through its connections with the vessel will be rotated by the rotation of the vessel.

The relative sizes and location of the pulleys F, F', G, and G', are such as that the speed of rotation of the separating surface, or the treatment vessel and the deflector will be somewhat different from that of the deflector, to enable it to most effectually assist in distributing the material for treatment, but if preferred, in some instances the deflector may be fixed to the treatment vessel and carried around with it, dispensing with the shafts, trunnion, pulleys and bearings to support and give it independent rotation, but in most instances I prefer to employ these parts and to rotate the vessel and deflector at a somewhat different rate of speed.

Preferably entering the hollow trunnion of the feed end of the vessel, are arranged appropriate feed pipes or conduits H, by which material for treatment, diluted with water, is fed into the vessel, and preferably near the other end, and around the largest diameter of the vessel, are discharge holes or orifices h. Surrounding or encircling such holes or orifices is a trough H', to catch the water and material discharged thereat.

The water and material as they are introduced into the vessel are carried by the action of centrifugal force to a position around near the outer diameter, and flow through the channel or passage to the opposite end of the vessel, where they are discharged through the holes or orifices h, carrying the lighter substances with them, during the operation, as hereinafter described. I also prefer to provide pipes h', or other equivalent means, extending in the vessel a desired distance to serve as an overflow for the water to prevent too much from accumulating in the discharge end of the vessel.

The trough H', is provided with discharge pipes or conduits I, at its lower side, preferably diverging into two branches, i, and i', one of which leads to a suitable bin or receptacle for the heavier portions of the material, and the other to a point of disposition of the lighter. At the junction of the branches, I preferably locate a hinged partition or door I', that may be swung from one side to the other, covering the entrance to either branch, and deflecting the material being discharged into its appropriate branch for deposit. The partition or door may be operated by a handle or lever, extending out through the wall of the pipe so as to be convenient of access; such handle, however, is not shown on the drawings.

To enable the automatic carrying out of my improved processes or methods, in which the speed of rotation of the treatment vessel is gradually increased or varied during the operation, in approximately the same degree or proportion as the space within the channel or passage in which the separation is effected is decreased, thereby automatically maintaining an approximately constant relative degree or proportion of intensity of momentum or impulse of water, and centrifugal force developed within the channel or passage, while the conditions therein are being varied, and to enable the centrifugal force developed to be gradually and automatically varied during the operation approximately inversely as the square of the variance in the size of the channel or passage, and in an approximately constant relative degree or ratio with that of the momentum or impulse of the water within the space in which the separation is effected, and by such automatic methods or processes separating the heavier portion of the material from the lighter, and to otherwise regulate and control the forces developed during the operation, in addition to the cone pulleys or drums C, and C', and the belt c, I provide preferably on the extended end of the shaft D, a small elongated cone pulley J; and an appropriate distance therefrom, properly located, I provide a counter-shaft j, supported in suitable bearings j', and carrying a cone pulley J', corresponding to the cone pulley J. A belt K, passes around the cone pulleys J, J', and through an adjustable guide K', so that the counter shaft j, may be rotated by the rotation of the shaft D, to which the motive power for operating the separator is applied by the belt d, as hereinbefore described. The speed of rotation of the counter-shaft may be regulated by the adjustment of the guide K', through the nut k, shifting or guiding the belt K, to contact with the one portion or another of its cone pulleys.

On the counter-shaft j, are mounted loose and tight pulleys L, and L', and an appropriate distance therefrom, properly relatively located is a rod or shaft M, supported in suitable boxes or bearings m, and having loose and tight pulleys N, N' mounted on its extended end.

Passing around to operate on the loose and tight pulleys, and between the guides m', of a shipper rod M', are belts O, one of which is intended to be crossed so as to transmit rotation to the parts that it drives in an opposite direction at the proper time, as hereinafter described.

The end of the rod M, opposite to that on which the pulleys N, N', are mounted, is provided with screw threads which engage with the threads of the screw or worm wheel O', as particularly shown in Fig. 5. The worm wheel O', is mounted in a fixed manner on the rod o, suitably supported in boxes o', so that as the wheel is rotated the rod is also rotated. One end of the rod o, is extended as shown, and is provided with screw threads which engage with the screw threads on the screw or worm wheel P, so that as the rod o, revolves the worm wheel P, is also slowly revolved; this worm wheel is provided with a central threaded hole or opening through which the threaded end of the shifter rod P', passes. The shifter rod being supported in bearings p, in a manner to permit of lengthwise movement, but not of rotation, so that as the worm wheel P, is rotated the shifter rod P', is slowly moved endwise in the one direction or the other, and through its extended guide pins p', shifts the belt c, on the cone pulleys or drums C, C', in the one direction or the other, as the movement of the shifter rod may be.

The relative location of the parts is intended to be such as to bring the shifter rod between the cone pulleys or drums, and in a line or position transverse to the line or path of travel of the belt c, and at a suitable distance therefrom, so that its extended guide pins may operate on, and shift or guide the belt through the movement of the shifter rod, as just explained.

The shifter rod preferably has its end or portion that extends through the box or support Q, flattened to prevent it from having a rotary motion or movement, or from tipping or swinging around its center. It is provided with the appropriately located extended guide pins, as explained, which serve to guide and move the belt c, along to operate on different parts of its cone pulleys or drums, so that the shifter rod, in its movement endwise in either direction during the operation of the separator, will move the belt c, to operate on one portion or another of the cone pulleys or drums, thereby increasing or decreasing the speed of rotation of the vessel, and the intensity of the centrifugal force being developed as the movement may be in the one direction or the other.

An appropriate distance from the shifter rod, and in preferably a parallel position to it, is located the rod Q', suitably supported in brackets q, in such a manner as to permit of its endwise movement. On that portion of this rod Q', that passes through the space of the travel of the guide pins, are adjustably secured, extended fingers R, located to contact at predetermined points with the guide pins. The fingers R, may be moved by means of the thumb screws r, and located or fixed on the rod Q', to contact with the guide pins, at any point in their travel, that it may be desired.

Suitably located at the opposite end of the rod Q', is a weighted lever S, pivotally supported at s, to a bracket s', as particularly shown in Fig. 6, with its lower extended end arranged to operate the shipper rod M', as will be hereinafter described. Another lever S', is preferably pivoted at its lower end, as particularly shown in Fig. 6, and is provided near its central portion with an elongated hole or slot, through which a pin or stud T, secured to the weighted lever is extended; to the opposite end of the lever S, is pivotally secured the end of rod Q'. The shipper rod M', is supported in the bearings, t, in a manner to permit of its lengthwise movement, and is provided with extended pins m' (Fig. 6), located with such relation to the lower extended end of the weighted lever as to contact with it and move the rod M', in the one direction or the other, as the weighted lever may fall, thereby shipping the belts O, and reversing the direction of rotation of the loose and tight pulleys, L, L' and N, N', and the parts that are driven by them.

The fingers R, may be adjusted on the rod to contact with one or the other of the guide pins p', at any point in their travels that it may be desired, at which time the rod Q', will be moved through such contact and be carried or moved along with the travel of the guide pins, and the shifter rod, carrying with it the lever S', and the weighted lever, to such an extent as to enable the latter to fall over its gravity center of pivotal support in the one direction or the other, as the case may be, thereby automatically shipping the belts O, and reversing the direction of its connected part, changing the direction of travel of the shifter rod P', and the guide pins and the movement of the belt c, along the cone pulleys or drums, automatically increasing or decreasing the speed of rotation of the treatment vessel, as the case may be. It will be seen, of course, that the parts will continue to move in the one direction or the other, until one or the other of the fingers R,—contacts with the guide pins, and thereby carries or moves the rod Q', a sufficient distance to enable the weighted lever to fall over the center of its pivotal support in the opposite direction, automatically shipping the belt O, and reversing the action or movement of such parts, as are driven by such belts.

By the adjustment of the fingers R, to contact with the guide pins at any desired point in their travel, the distance or extent of the movement of the belt c, lengthwise on its cones or drums, may be predetermined, as desired, and consequently the extent of the variance in the speed of the rotation of the vessel, and the intensity of centrifugal force developed may be predetermined, adjusted, and automatically governed. The speed or rapidity with which the speed of rotation of the vessel is varied, may be regulated, increased or decreased by the adjustment of the guide K', moving the belt K, to operate on the one portion or another of the cone pulleys J, J', thereby increasing or varying the rapidity of the movement or rotation of the parts that are driven or operated by the belt K, and that shift and guide the belt c.

The sizes and proportions of the several cones and other parts, together with the latitude of adjustment permitted through the cone pulleys J, J', are intended to be such as to secure variance in the speed of rotation of the vessel, approximately inversely as the variance in the size or area of the space, channel or passage in which the separation is effected, by the accumulation therein of the heavier portions of the material being treated.

While I have shown and described but one means for changing the speed of rotation of the vessel, such means may be varied as may best suit the operator, or the conditions of the material being treated, so long as they serve to effect the purposes herein set forth.

At the beginning of the operation, the belt c, is intended to be at the largest end of the cone pulley or drum C, or at such portion thereof as to secure the desired initial speed of rotation of the vessel, and of course at the smaller end, or a proper corresponding point on the cone or drum C', and the parts by which it is shifted, are intended to be in a position to start to first move the belt toward the opposite end of the cone; or in a direction to increase the speed of rotation of the vessel from the beginning.

The treatment vessel is rotated at the commencement sufficiently rapid to develop centrifugal force of a minimum desired intensity, and the guide parts operating the shifter rod and guide pins, adjusted so as to shift the belt c, along lengthwise of its cones sufficiently fast to increase the speed of rotation of the vessel approximately as the size of the space within the channel or passage b, is decreased by the accumulation of the heavier material therein.

The material is intended to be introduced into the receiving end of the vessel through the pipes H, or other suitable means, diluted with a sufficient amount or quantity of water to preferably fill the channel or passage and so that its velocity of flow through the channel or passage, toward the discharge end of the vessel will be sufficient to develop or produce momentum or impulse of requisite initial intensity relative to the initial centrifugal force developed, to move or wash the lighter substances of the material through the channel or passage, to be discharged with the water through the holes or orifices—and to permit the heavier to accumulate therein. As the heavier portions of the material accumulate in the passage, its size thereby is decreased, and the velocity of flow of the water, and its momentum are increased immediately and, were it not for the proper increasing speed of rotation of the vessel, the momentum or impulse of the water would very quickly become so great as to move the heavier portions of the material through with the lighter, without separation, but as soon as the operation commences, the belt c, is slowly, gradually and automatically moved toward the opposite ends of its cone pulleys, through the rotation of the parts operated by the belts K, and O, as already explained, until the belt c, has been moved by its guide pins, to the predetermined extent, at which time one of the fingers R, through its contact with its appropriate guide pin, has moved the weighted lever sufficiently far to enable it to fall over its center of pivotal support, and through its connection ships the belts O, thereby reversing the direction of rotation and movement of the parts driven by these belts, commencing at once to move the belt c, toward the other end of its cone pulleys, or to its initial point, to be again automatically reversed, and the operation repeated.

The quantity of feed of the material, and the positions and adjustment of the parts, are intended to be such that, at the time the belt c, is at the largest point to which it ascends on its cone C, and the vessel is consequently being rotated the most rapidly, the desired quantity of heavier material has been accumulated in the channel or passage, preferably a sufficient quantity to largely fill the same,—the speed of rotation of the vessel and the velocity of flow of the water having been increased during the operation in approximately a constant degree or proportion, as the size of the channel or passage was decreased, and the momentum or impulse of the water, and the centrifugal force having been varied in an approximately constant relative degree, and approximately inversely as the square of the variance in the space in which the separation was effected. At this time, the desired amount of heavier portions of the material having been accumulated, the feed of the material to the separator may now be discontinued, and while the belt c, is being shifted on its cones to its starting point, and the vessel brought to its initial speed of rotation, the door I', in the discharge pipe, may be shifted to deflect the heavier portion of material into its appropriate branch pipe, and an amount of water introduced to the vessel, through the feed pipe, or other sufficient means requisite to remove or wash out the accumulated heavier portion from channel or passage in the separator, discharging it through the orifices h, as in the instance of the lighter. When the heavier portion has thus been removed and the belt c, has reached its initial point, its travel is again automatically shifted, the flow of the flush water, as I may term it, is discontinued, the door I', turned back to its original position, and the flow or feed of material for treatment with the appropriate amount of water again commenced, and the operation repeated,—the shifting and reshifting of the belts being automatically carried on, in the manner explained, and the variance in the speed of rotation of the vessel and of the force developed being intermittently and automatically increased and decreased, while their relative, or proportionate intensities are maintained approximately constant.

Where I have used the term "approximately," in the specification and claims, I mean it in a sufficiently broad sense to qualify the state, action, result, cause and effect to which it may refer or relate, to such extent as to afford such latitude as the conditions of the material or the circumstances attending the operation may admit, and still secure the desired result.

What I regard as new, and desire to secure by Letters Patent, is—

1. The method or process of separating material containing substances of different degrees of specific gravity, when in a powdered or finely divided condition, which consists in subjecting such material to the action of centrifugal force and at the same time to momentum or impulse of water of sufficient intensity to move the lighter substances of the material being treated, and to permit the heavier to accumulate, and varying the intensity of the centrifugal force developed approximately as the intensity of the momentum or impulse of the water is varied during the operation, substantially as described.

2. The method or process of separating material containing substances of different degrees of specific gravity, when in a powdered or finely divided condition, which consists in subjecting such material to the action of centrifugal force and at the same time to momentum or impulse of water of sufficient intensity to move the lighter substances of the material being treated, and to permit the heavier to accumulate, and varying the intensity of the centrifugal force developed inversely approximately as the square of the variance, as the operation proceeds, in the size of the space in which the separation is effected, substantially as described.

3. The method or process of separating material containing substances of different degrees of specific gravity, when in a powdered or finely divided condition, which consists in subjecting such material to centrifugal force, and momentum of water of requisite intensities and relative proportions to move the lighter substances and to permit the heavier to accumulate, and varying the centrifugal forces in approximately a constant relative degree, and inversely approximately as the square of the variance of the size of the space, in which the separation is effected, substantially as described.

4. The method or process of separating material containing substances of different degrees of specific gravity, when in a powdered or finely divided condition, which consists in passing such material into a covered channel or passage, subjecting it while therein to the action of centrifugal force—and at the same time to sufficient momentum or impulse of water to move the lighter substances and to permit the heavier to accumulate, and, as the operation progresses, maintaining an approximately constant quantity or amount of water passing through the channel or passage, in which the separation is effected, and increasing the intensity of the centrifugal force approximately as the square of the decrease in the size of the space in the channel or passage, substantially as described.

5. The method or process of operating centrifugal ore separators, which consists in rotating the vessel thereof with sufficient rapidity to develop the initial amount of centrifugal force desired, passing the material to be separated into the channel or passage within the vessel, in which the separation is effected, forcing sufficient amount or quantity of water through such channel or passage to develop requisite momentum or impulse to move the lighter substances of the material and to permit the heavier to accumulate, and varying the speed of rotation of the vessel inversely approximately as the size of the space in the channel or passage in which the separation is effected is varied during the operation by the accumulation of the heavier portions of the material therein, substantially as described.

6. The method or process of operating centrifugal ore separators, which consists in rotating the vessel thereof with sufficient rapidity to develop the amount of centrifugal force desired passing the material to be separated into the channel or passage within the vessel, in which the separation is effected, forcing sufficient amount or quantity of water through such channel or passage to develop requisite momentum or impulse to move the lighter substances of the material and to permit the heavier to accumulate, maintaining an approximately constant quantity or amount of water flowing through the space while the separation is progressing, and increasing the speed of rotation of the vessel approximately as the size of the space is decreased during the operation, substantially as described.

7. The method or process of operating centrifugal ore separators, which consists in rotating the vessel thereof with sufficient rapidity to develop the amount of centrifugal force desired, passing the material to be separated into the channel or passage within the vessel, in which the separation is effected, forcing sufficient amount or quantity of water through such channel or passage to develop requisite momentum or impulse to move the lighter substances of the material and to permit the heavier to accumulate, maintaining an approximately constant quantity or amount of water flowing through the space while the separation is progressing, and increasing the speed of rotation of the vessel approximately as the size of the space is decreased during the operation, until an appropriate quantity of heavier has accumulated, then increasing the flow of water requisite to wash out the accumulated heavier portions of the material, substantially as described.

8. The method or process of operating centrifugal ore separators, which consists in rotating the vessel thereof with sufficient rapidity to develop the amount of centrifugal force desired, passing the material to be separated into the channel or passage within the vessel, in which the separation is effected, forcing sufficient amount or quantity of water through such channel or passage to develop requisite momentum or impulse to move the lighter substances of the material and to permit the heavier to accumulate, maintaining an approximately constant quantity or amount of water flowing through the space while the separation is progressing, and increasing the speed of rotation of the vessel approximately as the size of the space is decreased during the operation, until an appropriate quantity of heavier substance has accumulated, then increasing the flow of water an appropriate time and amount requisite to wash the accumulated heavier substance out; decreasing the speed of rotation of the vessel and the flow or momentum of the water to the initial point, preparatory to repeating the operation, substantially as described.

9. In a centrifugal ore separator, the combination of a rotatable vessel, and means for varying the intensity of centrifugal force developed approximately as the intensity of momentum or impulse of water is varied in the channel or passage in which the separation is effected during the operation, substantially as described.

10. In a centrifugal ore separator, the combination of a rotatable vessel, and means for automatically varying the intensity of centrifugal force developed approximately as the intensity of momentum or impulse of water is varied in the channel or passage in which the separation is effected, during the operation, substantially as described.

11. In a centrifugal ore separator, the combination of a rotatable vessel, and means for varying the centrifugal force developed inversely approximately as the square of the variance during the operation, in the size of the channel or passage in which the separation is effected, substantially as described.

12. In a centrifugal ore separator, the combination of a rotatable vessel, and means for automatically varying the centrifugal force developed inversely approximately as the square of the variance during the operation, in the size of the channel or passage in which the separation is effected, substantially as described.

13. In a centrifugal ore separator, the combination of a rotatable vessel, and means for varying the speed of rotation of the vessel, approximately inversely as the variance in size of the channel or passage in which the separation is effected, by the heavier portions, substantially as described.

14. In a centrifugal ore separator, the combination of a rotatable vessel, and means for automatically varying the speed of rotation of the vessel approximately inversely as the variance in the size of the channel or passage in which the separation is effected by the heavier portions of the material, substantially as described.

ORRIN B. PECK.

Witnesses:
M. O'BRIEN,
EDMOND C. PECK.